United States Patent [19]

Togino

[11] Patent Number: 5,594,588
[45] Date of Patent: Jan. 14, 1997

[54] VISUAL DISPLAY

[75] Inventor: Takayoshi Togino, Tokyo, Japan

[73] Assignee: Olympus Optical Co., Ltd., Tokyo, Japan

[21] Appl. No.: 51,386

[22] Filed: Apr. 23, 1993

[30] Foreign Application Priority Data

Apr. 24, 1992 [JP] Japan .................. 4-106912
Apr. 24, 1992 [JP] Japan .................. 4-106913

[51] Int. Cl.$^6$ .................................................. G02B 27/14
[52] U.S. Cl. .............................................. 359/631; 359/728
[58] Field of Search ................................ 359/364, 631, 359/630, 869, 839, 727, 728, 13, 14

[56] References Cited

U.S. PATENT DOCUMENTS

| | | | |
|---|---|---|---|
| 3,787,109 | 1/1974 | Vizenor | 359/631 |
| 3,816,005 | 6/1974 | Kirschner | 359/631 |
| 3,870,405 | 3/1975 | Hedges | 359/631 |
| 3,923,370 | 12/1975 | Mostrom | 359/630 |
| 4,026,641 | 5/1977 | Bosserman et al. | |
| 4,582,389 | 4/1986 | Wood et al. | 359/631 |
| 4,669,810 | 6/1987 | Wood | 359/364 |
| 4,799,765 | 1/1989 | Ferrer | 359/631 |
| 5,006,072 | 4/1991 | Letovsky et al. | 359/631 |
| 5,257,094 | 10/1993 | LaRussa | 359/14 |

*Primary Examiner*—Georgia Y. Epps
*Assistant Examiner*—Thomas Robbins
*Attorney, Agent, or Firm*—Cushman, Darby & Cushman

[57] ABSTRACT

A portable visual display which enables observation of an image with minimal distortion includes a two-dimensional display device (7) for displaying an image for observation, and an ocular optical system (6) for projecting an image formed by the two-dimensional display device (7) or a real image thereof in the air as a magnified image and for deviating the optical axis. The ocular optical system (6) is comprised of a concave aspherical mirror. The concave mirror (6) is designed so that the curvature thereof in a direction (X direction) perpendicular to a plane (Y-Z plane) in which the optical axis conventionally increasingly deviates gradually increases in a direction (−Y direction) in which the optical axis is deviated as seen from the observer's eye (1). Alternatively, the arrangement may be such that a relay optical system for projecting a real image of the image formed by the two-dimensional image display device (7) in the air is provided, and a part or the whole of the relay optical system is disposed so that the optical axis thereof is inclined toward a direction normal to the object surface away from a straight line connecting the object center and the image center.

16 Claims, 14 Drawing Sheets

FIG. 7A (Horizontal direction (Y)) (+15.0°) (Vertical direction (X))

FIG. 9A (Horizontal direction (Y)) (+15.0°)
FIG. 9A-1 (Vertical direction (X))
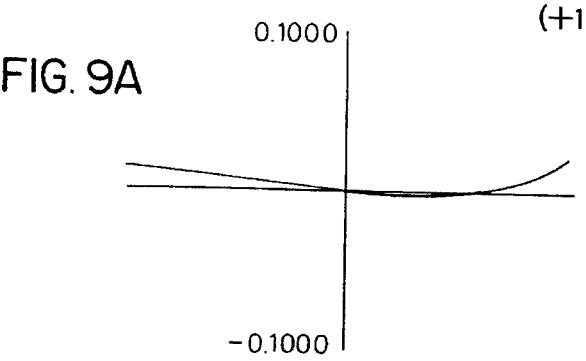
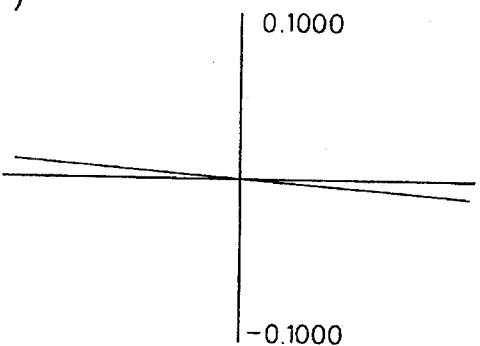
FIG. 9B (0°)
FIG. 9B-1
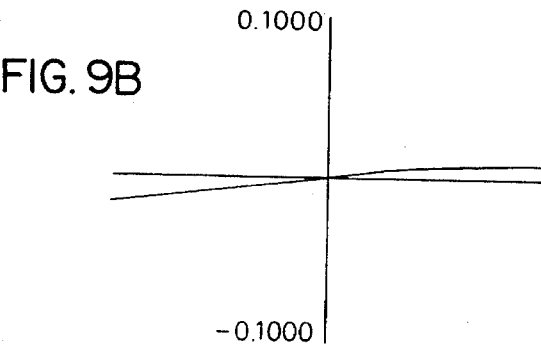
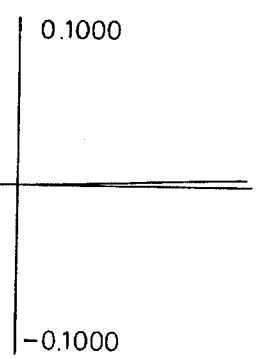
FIG. 9C (−15.0°)
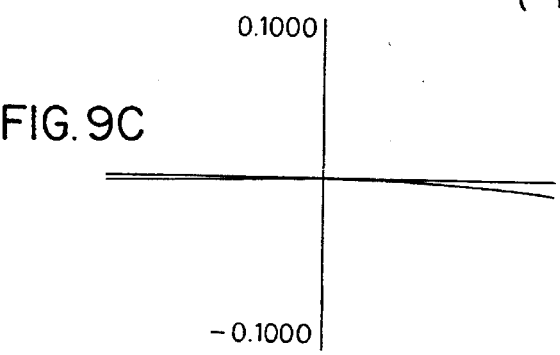
FIG. 9C-1

6 Ocular optical system
7 Two-dimensional display device
8 HMD
9 Head band

8 HMD
9 Head band

VISUAL DISPLAY

FIELD OF THE INVENTION

The present invention relates to a portable visual display and, more particularly, to a head-mounted or face-mounted display that can be retained on the observer's head or face.

BACKGROUND OF RELATED ART

A head-mounted display such as that shown in the plan view of FIG. 15 has heretofore been known (see U.S. Pat. No. 4,026,641). In this conventional head-mounted display, an image of an image display device 46, e.g., a CRT, is transferred to an object surface 12 by an image transfer device 25, and the image transferred to the object surface 12 is projected in the air by a toric reflector 10.

BACKGROUND OF THE INVENTION

In such a head-mounted display, it is important to minimize the overall size of the apparatus for enabling it to be mounted on the observer's head effectively and comfortably. It is necessary, in order to minimize the overall size of the apparatus, to adopt an arrangement in which the two-dimensional image display device is disposed on the top or side of the observer's head. For this purpose, it is essential to employ an eccentric reflecting surface that reflects the optical axis of the observer who looks forward and that deviates (angularly deflects) the reflected optical axis to the side of the observer's eyeball position. It should be noted that the term "optical axis" as used herein means a ray of light that passes through the observer's eyeball iris center or eyeball rolling center and also passes through the display center of the two-dimensional image display device, that is, axial light ray.

When the reflecting surface is not a concave surface, it is difficult to ensure a wide field angle unless the size of the image display device is increased. Accordingly, the overall size of the apparatus increases. Further, since it is necessary to ensure a wide field angle in order to enhance the feeling of being at the actual spot, which is given to the user when viewing the displayed image, a large reflecting surface needs to be disposed.

For the above-described two reasons, it is necessary in the optical arrangement of the head-mounted display to dispose a relatively large concave mirror immediately in front of the observer's eyeball.

However, if the above-described arrangement is adopted and a relatively large concave mirror is used in order to ensure a wide field angle for observation, trapezoidal distortion of the image occurs. The cause of the occurrence of trapezoidal image distortion will be explained below with reference to FIG. 1.

FIG. 1 is a bird's-eye view showing the paths of light beams from the observer's iris position to a two-dimensional image display device or a position where an image thereof is projected. FIG. 1 shows an optical arrangement of the visual display of the present invention with respect to the observer's right eye. Referring to the figure, the Y-axis represents a direction in which the concave mirror 6 deviates from the optical axis, and it is in a horizontal direction to the observer. The positive direction of the Y-axis corresponds to the direction toward the center of the observer's head, that is, the leftward direction for the right eye. The X-axis corresponds to the vertical direction to the observer. The positive direction of the X-axis corresponds to the downward direction from the observer's head.

In FIG. 1, reference numeral 1 denotes an observer's iris position or eyeball rolling position. A light beam 2 is at a viewing angle of 15° horizontally to the left of the optical axis. A light beam 3 is at a viewing angle of 15° horizontally to the left and 10° downward from the optical axis. A light beam 4 is at a viewing angle of 15° horizontally to be right of the optical axis. A light beam 5 is at a viewing angle of 15° horizontally to the right and 10° downward from the optical axis. A light beam 100 is at a viewing angle on the optical axis, and light beam 101 is at a viewing angle 10° downward from the optical axis. A concave mirror 6 constitutes the ocular optical system. Reference numeral 7 denotes a focal surface of the concave mirror 6 on which a two-dimensional image display device or a projected image thereof is disposed.

In FIG. 1, backward tracing of light rays is made from the observer's eyeball position 1 to the focal surface 7 of the concave mirror 6 in order to show the way in which ideal light beams which are seen as a rectangle by the observer are focused by the concave mirror 6.

When the concave mirror focal surface 7, shown in FIG. 1, has a spherical surface or an aspheric surface (e.g., a toric surface, an anamorphic surface, a parabolic surface, an elliptical surface, etc.) as in the prior art, the height of the image in the direction of the X'-axis varies according to the location of the focal surface 7, on the Y'-axis resulting in trapezoidal distortion of the image. The reason for this is that the optical path distance from the exit pupil of the ocular optical system 6, which is disposed in the vicinity of the observer's eyeball rolling center or iris 1 (shown in FIG. 1), to the concave reflecting mirror 6 depends largely on the viewing angle in the Y-axis direction, which is the viewing direction of the observer. More specifically, since the optical axis of the concave reflecting mirror 6 and the optical axis of the eyeball and display center are eccentric with respect to each other, the light beams 4 and 5, which are viewed in the negative direction of the Y-axis from the observer's eyeball position 1 (shown in FIG. 1), are longer than the light beams 2 and 3, which are viewed in the positive direction of the Y-axis, in terms of the optical path distance through which the light beams are incident on the concave reflecting mirror 6 and reflected therefrom. Accordingly, the light beams 4 and 5 are reflected after diverging substantially. In other words, when the light beams fall on the concave mirror 6, the spacing between the light beams 4 and 5 is larger than the spacing between the light beams 2 and 3.

For the reasons described above, in an eccentric optical system wherein the light beams are is deviated differently depending on location on the Y-axis of the concave mirror 6, which is an ocular optical system in which the optical axis is disposed at an angle of inclination, the image height in (the positive direction of the X-axis in FIG. 1 perpendicular to the direction in which the optical depends upon the location of the optical axis of the pupil/display center on the Y-axis of the concave mirror 6. Accordingly, the variation in the image height appears as trapezoidal distortion of the image to the observer.

In a prior art display that uses a reflecting mirror with a toric surface, image distortion such as that shown in FIG. 16 occurs. When an elliptical surface is used as a reflecting surface, image distortion such as that shown in FIG. 17 occurs. Even if a spherical surface is used, similar trapezoidal distortion of the image occurs. Thus, with the prior art, only a distorted image can be observed, and hence the observed image is unnatural. It should be noted that in FIGS. 16 and 17, the size of an ideal image of a rectangle seen at viewing angles of 15° horizontally to the left and right and 10° downward to the optical axis is shown by the dotted line, and the actual distorted image is shown by the solid line. The coordinates are assigned the same as in FIG. 1.

When the observer sees the same image with both eyes at the same time, the two images viewed by the right and left eyes differ in size. In such a case, the two images may be difficult to fuse into one image, or the observer may be unable to fuse the observed images, resulting in a double image.

Further, when the left and right eyes are allowed to view respective images having a parallax with respect to each other to provide stereoscopic vision, if the left and right images do not fuse with each other, it is impossible to obtain a sensation of depth as associated with three-dimensional vision.

SUMMARY OF THE INVENTION

In view of the above-described problems of the prior art, it is an object of the present invention to provide a portable visual display which provides an image having minimal distortion to an observer.

To attain the above-described object, the present invention provides a visual display including a two-dimensional display device for displaying an image for observation. There is also provided an ocular optical system for projecting an image formed by the two-dimensional display device, or a real image thereof, in the air as a magnified image and for deviating the optical axis exiting from the two-dimensional display device, thereby directing the projected image to an observer's eyeball. The visual display further includes a mechanism for supporting the ocular optical system in front of the observer's eyeball and for enabling both the two-dimensional display device and the ocular optical system to be mounted on the observer's face or head. The visual display is provided with a mechanism for correcting distortion of the image for observation which is led to the observer's eyeball.

More specifically, the present invention provides a visual display including a two-dimensional display device for displaying an image for observation, and an ocular optical system having a concave reflecting mirror or semitransparent reflecting mirror for projecting an image formed by the two-dimensional display device or a real image thereof in the air as a magnified image and for deviating the optical axis exiting from the two-dimensional display device, thereby directing the projected image to an observer's eyeball. To correct distortion of the image for observation which is directed to the observer's eyeball, the reflecting mirror or semitransparent reflecting mirror is provided with an aspherical configuration. This aspherically configured mirror acts as distortion correcting means having a curved concave surface, the curvature being in a direction approximately perpendicular to a plane defined by the optical axis before deviation by the concave surface and the optical axis after the curvature the deviation gradually increasing toward the two-dimensional display device side from the observer's eyeball side (see FIGS. 18A–18E). FIG. 18A shows a horizontal (y-axis) cross-section view of reflecting mirror 6. FIGS. 18B to 18E show a vertical (x-axis) cross section view of reflecting surface 6 at positions a to d of FIG. 18A, respectively. As shown, the vertical curvature increases (i.e., the radius of curvature decreases) in a linear direction; across the reflection surface 6 from a size corresponding to the observer's eye (FIG. 18B) to a side corresponding to the display device (FIG. 18E).

In this case, the concave reflecting mirror or semitransparent reflecting mirror is preferably disposed so that the angle between the optical axis before deviation by the concave surface and the optical axis after the deviation is 20 degrees or more. Further, the focal length of the ocular optical system is preferably in the range of from 20 mm to 150 mm, particularly preferably from 30 mm to 60 mm.

According to another aspect of the present invention, there is provided a visual display including a two-dimensional display device for displaying an image for observation, and a relay optical system for forming a real image of the image formed by the two-dimensional display device. The visual display further includes an ocular optical system for projecting the real image in the air as a magnified image and for deviating the optical axis exiting from the two-dimensional display device, thereby directing the image to an observer's eyeball. The two-dimensional display device is tilted eccentrically with respect to the optical axis a part or the whole of the relay optical system is disposed so that the optical axis thereof is inclined toward a direction normal to the two-dimensional display device, away from a straight line connecting the center of the image to the center of the real image. Such a disposed portion acts as means for correcting distortion of the image for observation led to the observer's eyeball.

In this case, it is preferable to set the angle β of inclination of a part or the whole of the relay optical system so as to satisfy the following condition:

$$\beta > 2°$$

The reasons for adopting the above-described arrangements and the functions thereof will be explained below.

According to the first aspect of the present invention, the trapezoidal distortion of the image can be successfully corrected using a concave aspherical reflecting mirror as an ocular optical system. That is, such correction can be achieved when the partial curvature of the concave reflecting mirror gradually increases in the direction in which the optical axis is deviated, in the direction of a plane perpendicular to the plane in which the optical axis is deviated.

The function of the arrangement according to the first aspect of the present invention will be explained below with reference to FIG. 1. With regard to the light beams 2 and 3 in the positive direction of the Y-axis (the direction opposite to that on which the light beam increasingly deviates) in which the image height in the direction of the X-axis undesirably decreases, spacing between the light beams 2 and 3 during the travel from the reflecting mirror 6 to the focal surface 7 of the reflecting mirror 6 is corrected by designing the reflecting mirror 6 to have a relatively small curvature in the direction of the X-axis where the light beams 2 and 3 are reflected. Thus, it is possible to correct distortion of the image, that is, to prevent a decrease in the image height in the direction of the X-axis.

On the other hand, for the light beams 4 and 5 in the negative direction of the Y-axis (the direction in which the light beam increasing deviates) in which the image height in the direction of the X-axis undesirably increases, the spacing between the axes of the light beams 4 and 5 during travel from the reflecting mirror 6 to the focal surface 7 is corrected by designing the reflecting mirror 6 to have a relatively large curvature in the direction of the X-axis where the light beams 4 and 5 are reflected. Thus, it is possible to correct distortion of the image, that is, to prevent an increase in the image height in the direction of the X-axis.

Accordingly, it is possible to correct trapezoidal image distortion due to the eccentric arrangement of the concave reflecting mirror 6.

It should be noted that the angle θ of deviation of the optical axis by the concave mirror 6 is preferably not smaller than 20°. If the deviation angle θ is smaller than 20°, the observer's eyeball position 1 and the two-dimensional image display device 7 are so close to each other that the two-dimensional image display device 7 cannot be disposed without interference from the observer's head.

Further, the focal length of the ocular optical system, which comprises the concave mirror 6, is preferably in the range of from 20 mm to 150 mm. If the focal length is shorter than the lower limit of the above range, the distance between the observer's eyeball position 1 and the ocular optical system 6 is excessively short, so that the observer feels a sensation of pressure when wearing this visual display, and a wide field angle cannot be ensured. On the other hand, if the focal length exceeds the upper limit of the above range, the distance between the observer's eyeball position 1 and the ocular optical system 6 becomes excessively long, resulting in an increase in the amount to which the ocular optical system 6 projects from the visual display. Accordingly, the observer feels uncomfortable when wearing the visual display.

It is particularly preferable to set the focal length of the ocular optical system in the range of from 30 mm to 60 mm. If the focal length is shorter than the lower limit of the above range, the ocular optical system may be touched by the observer's eyelashes if they are relatively long, and it is difficult for the observer who wears glasses to wear the ocular optical system. Further, if the focal length is excessively short, the visual display may be unfit for observers with a clear-cut face or a high-bridged nose. On the other hand, if the focal length is set shorter than 60 mm, the visual display is further reduced in the overall size and weight, so that it becomes easy to wear.

According to another aspect of the present invention, the visual display is provided with a function of correcting distortion such as that shown in FIGS. 16 or 17. More specifically, the present invention provides a visual display including a relay optical system that projects a real image of a two-dimensional image display device in the air, and an ocular optical system comprised of a concave mirror for projecting the real image in the air as a magnified image and for deviating the optical axis toward the observer's eyeball, wherein a lens system having an eccentric surface is used for the relay optical system, thereby correcting such distortion as that shown in FIGS. 16 or 17.

That is, a decentered lens or the like is used for the relay optical system to distort the image projected in the air to cancel the distortion from the ocular optical system. With this method, it is possible to eliminate the above-described image distortion from the image viewed by the observer's eye.

It is generally known that trapezoidal distortion of the image can be corrected by the swing & tilt method, which is a photographic method commonly practiced for camera lenses and the like. FIG. 14(A) shows an image which is formed when a tall building or the like is photographed from a low position. As will be clear from the image shown in the figure, an image of a higher part of the building is formed relatively small because it is relatively distant from the camera lens, whereas, an image of a lower part of the building is formed relatively large. To correct the distortion of the image, the optical axis of the lens is moved parallel to the object and upwardly, and the camera is rotated clockwise so that the optical axis of the lens is inclined at an angle A with respect to a straight line connecting the object center and the image center, as shown in FIG. 14(B). Thus, a photograph having image distortion corrected is obtained.

According to the second aspect of the present invention, however, the relay optical system, which projects a real image of the two-dimensional image display device in the air, is inclined to produce trapezoidal distortion intentionally so that it cancels trapezoidal distortion attendant on the ocular optical system.

A concave reflecting mirror with a large field angle, which may be used to constitute an ocular optical system, causes a large coma. Therefore, to correct the aberration, a reflecting mirror with a toric surface, an anamorphic surface, an elliptical surface, etc. is used. Consequently, it becomes possible to view an image which is clear as far as the peripheries thereof. Qualitatively, however, any type of concave mirror causes the same trapezoidal distortion. With regard to the direction of the trapezoidal distortion, the magnification in a direction perpendicular to the plane in which the optical axis deviates increases in a direction in which the distance from the position at which the optical axis is deviated increases as seen from the observer's iris position, while it decreases in the opposite direction to the above. To correct the distortion, the lens system is inclined toward the object away from the longer base of the trapezoid (clockwise as viewed in FIGS. 10 and 14A). By doing so, the trapezoidal distortion can be corrected effectively. The second aspect of the present invention makes good use of this distortion correcting effect.

The angle β of inclination of the relay optical system is specified by the conditional expression: β>2°. If the angle of inclination is smaller than the lower limit of the condition, it is impossible to obtain sufficient effectiveness for correcting trapezoidal image distortion, which is an advantageous feature of the present invention.

When the visual display of the present invention is used as a head-mounted display (HMD) 8, it is mounted on the observer's head by attaching a head band 9, for example, as shown in FIGS. 13(A) and 13(B), which are sectional and perspective views, respectively.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 9A to 9C graphically show lateral aberration in embodiment 3 of the present invention.

DESCRIPTION OF THE PREFERRED EMBODIMENTS

Embodiments 1 to 5 of the visual display according to the present invention will be described below. Among the embodiments, the embodiments 1 to 3 are arranged according to the first aspect of the present invention, while the embodiments 4 and 5 are arranged according to the second aspect of the present invention.

Embodiment 1

Figure 1:
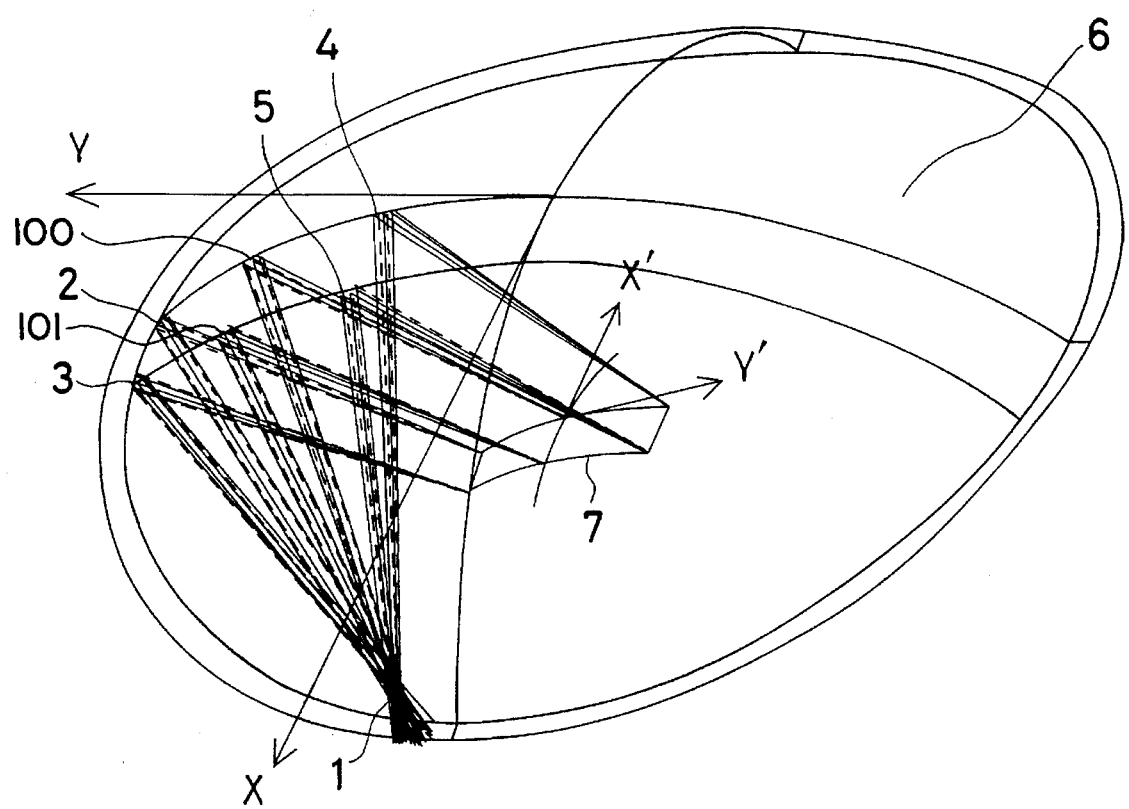
FIG. 1 is bird's-eye view showing the paths of light beams in a visual display according to the first aspect of the present invention.
Figure 2:
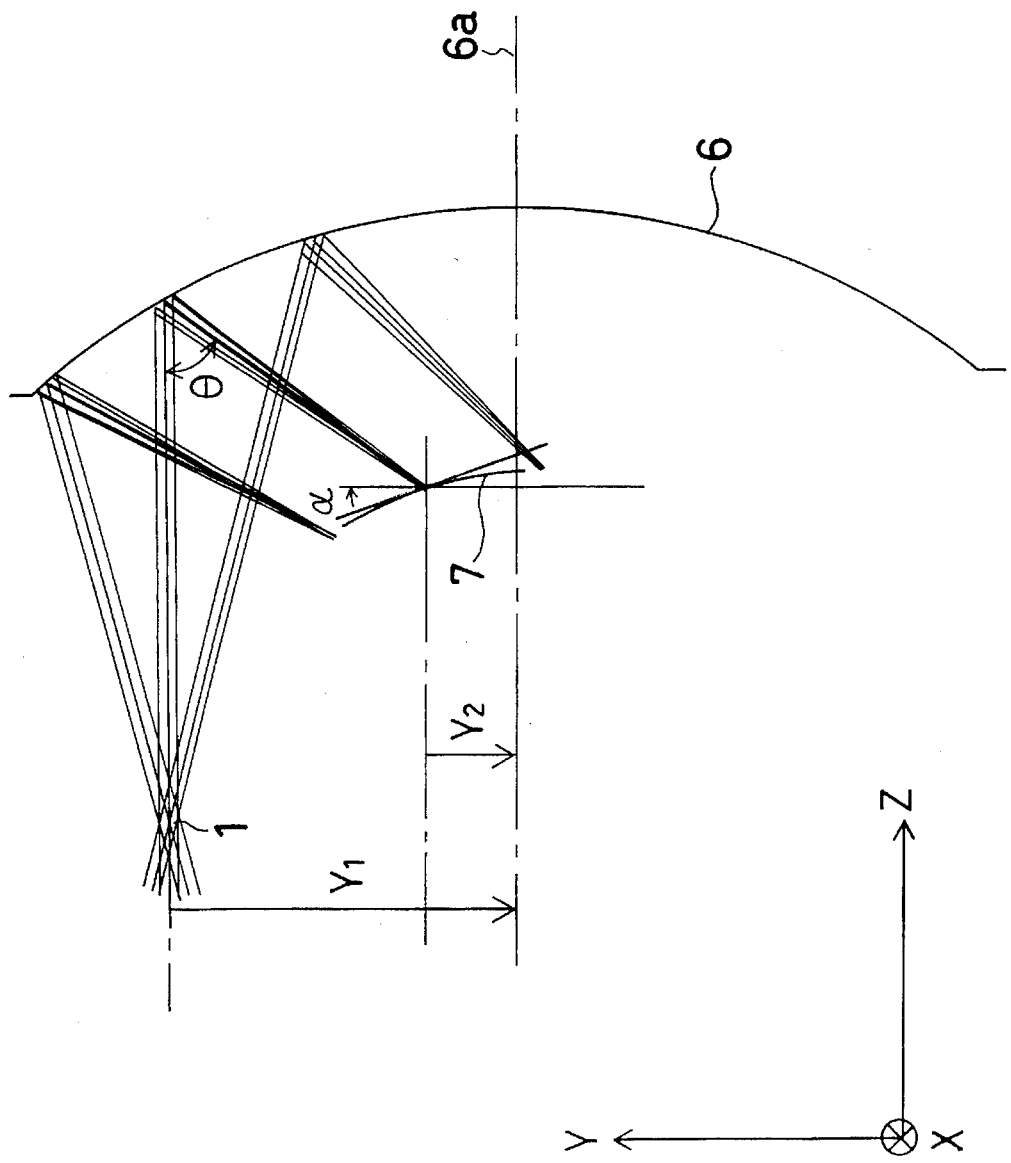
FIG. 2 shows the optical arrangement of a visual display according to embodiment 1 of the present invention.

The embodiment 1 of the present invention will be described below with reference to FIG. 2. FIG. 2 is a sectional view taken in the direction of the Y-axis. The eccentricity of the concave mirror 6 with respect to the observer's iris position or eyeball rolling center position 1 is given on the basis of the same coordinate system as that shown in FIG. 1. In the figure, reference numeral 7 denotes a two-dimensional image display device or a projected image thereof. Reference numeral 6 denotes a concave anamorphic aspherical reflecting mirror. Reference numeral 1 denotes an observer's iris position or eyeball rolling center position (hereinafter referred to as "exit pupil"). It is assumed that the axis of the concave reflecting mirror 6 is 6a, and the distance (eccentricity) from the center of the exit pupil 1 to the axis 6a of the reflecting mirror 6 is $Y_1$, while the distance (eccentricity) from the center of the two-dimensional image display device 7 to the axis 6a is $Y_2$. In the case of the coordinate system shown in FIG. 2, both the eccentricities $Y_1$ and $Y_2$ are given as negative values. In addition, the angle of inclination of a plane perpendicular to the axis 6a with respect to a tangent plane contacting the center of the two-dimensional image display device 7 is assumed to be $\alpha$. In the case of the illustrated example, $\alpha$ is positive.

Constituent parameters of the optical system will be shown below. It should be noted that the surface Nos. are put as ordinal numbers in backward tracing from the exit pupil 1 toward the two-dimensional image display device 7. When the coordinate system is set as illustrated in the figure and the paraxial curvature radius of each of the concave reflecting mirror 6 and the two-dimensional image display device 7 in the vertical direction (X-Z plane) is $R_x$, while that in the horizontal direction (Y-Z plane) is $R_y$, the aspherical configuration may be expressed by $$Z = [(X^2/R_x) + (Y^2/R_y)]/[1 + \{1 - (1 + K_x)(X^2/R_x^2) - (1 + K_y)(Y^2/R_y^2)\}^{1/2}] + AR[(1 - AP)X^2 + (1 + AP)Y^2]^2 + BR[(1 - BP)X^2 + (1 + BP)Y^2]^3 + CR[(1 - CP)X^2 + (1 + CP)Y^2]^4$$

where $K_x$ is the conical coefficient in the X-direction; $K_y$ is the conical coefficient in the Y-direction; AR, BR and CR are rotationally symmetric 4th-, 6th- and 8th-order aspherical coefficients, respectively; and AP, BP and CP are asymmetric 4th-, 6th- and 8th-order aspherical coefficients, respectively.

| Surface No. | Curvature radius | Surface separation | Eccentricity |
|---|---|---|---|
| 1 | exit pupil (1) | 50.0 | $Y_1$ −28.285 |
| 2 | $R_y$ 59.071 (6) $R_x$ 43.981 (aspheric surface) | 22.39 | $Y_2$ −6.0247 |
| 3 | $R_y$ 36.164 (image surface 7) $R_x$ 10.699 (aspheric surface) | | |

| Aspherical coefficients | |
|---|---|
| Second surface (concave mirror 6) | |
| $K_y = 0$ | $K_x = 0$ |
| $AR = -0.126331 \times 10^{-5}$ | $AP = -0.585287$ |
| $BR = 0$ | $BP = 0$ |
| $CR = 0$ | $CP = 0$ |
| Third surface (image surface 7) | |
| $K_y = 0$ | $K_x = 0$ |
| $AR = 0$ | $AP = 0$ |
| $BR = 0$ | $BP = 0$ |
| $CR = 0$ | $CP = 0$ |
| $\alpha = 15.8529°$ | |

Figure 4:
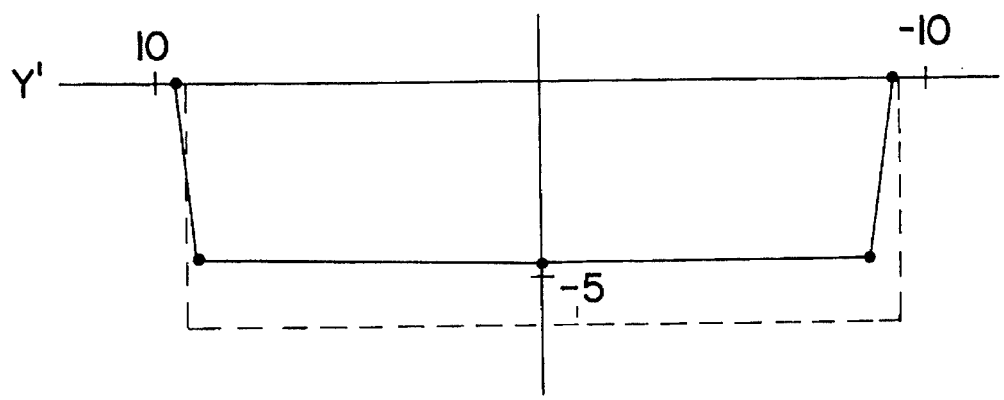
FIG. 4 shows image distortion in embodiment 1 of the present invention.
Figures 1, 7A:
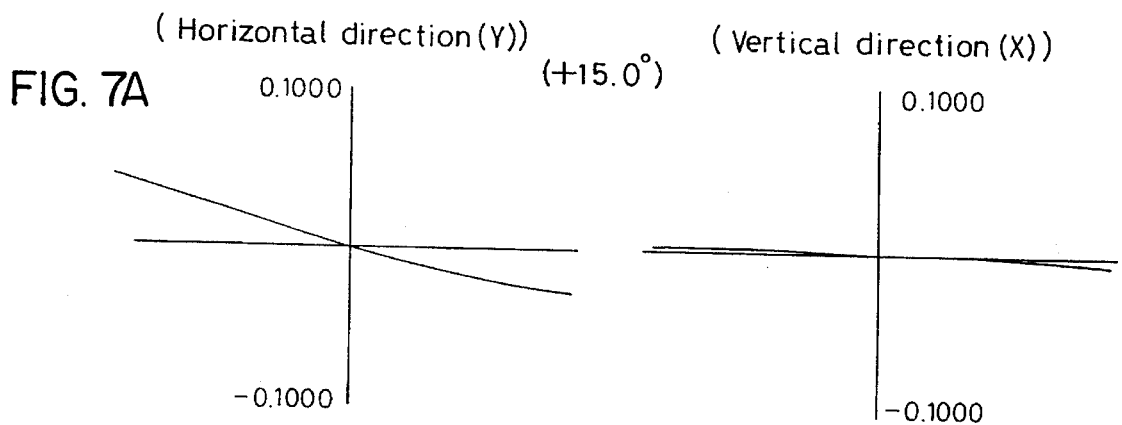
FIGS. 7A to 7C graphically show lateral aberration in embodiment 1 of the present invention.
Figures 1, 7B:
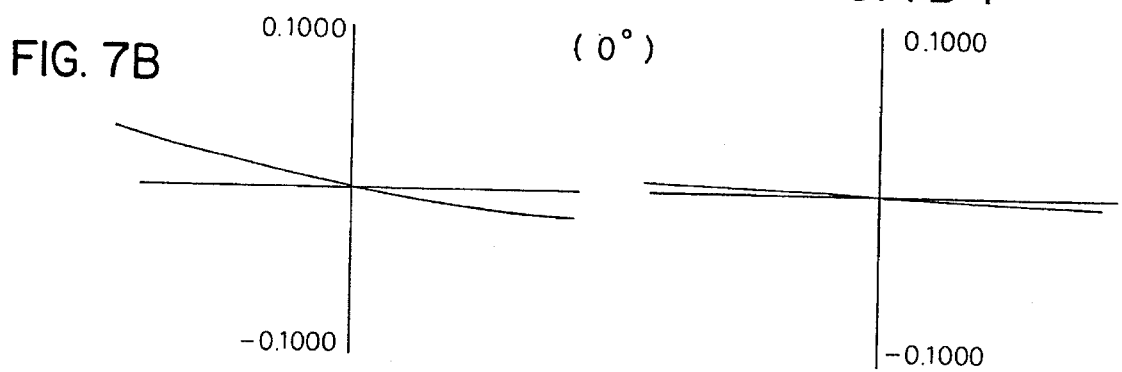
Figures 1, 7C:
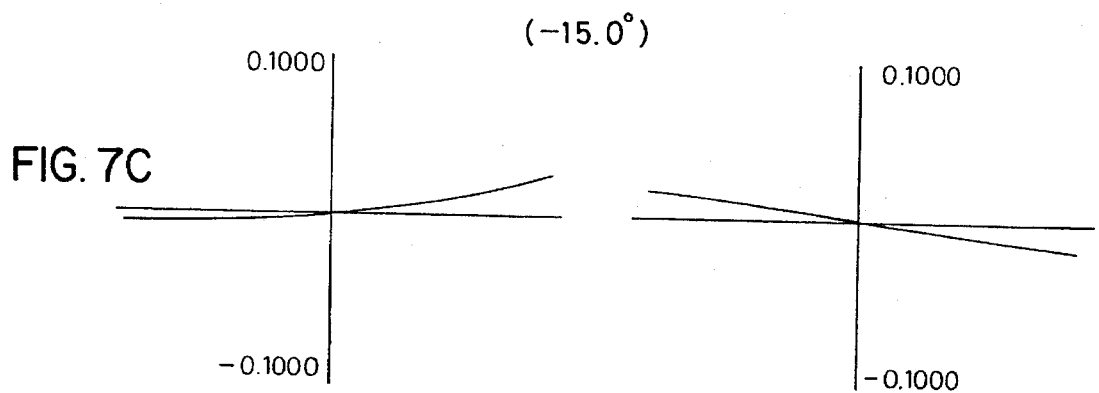

FIG. 4 shows image distortion in this embodiment. In FIG. 4, the dotted line shows the ideal image position, and the solid line shows the actual imagery position of the optical system. FIGS. 7A to 7C graphically show lateral aberration in this embodiment. FIG. 7A shows aberrations in the horizontal and vertical directions occurring when the observer sees an image which is at 15.0° left (+Y direction) of a straight line passing through the center of the pupil 1 and parallel to the axis 6a. FIG. 7B shows aberrations in the horizontal and vertical directions occurring when the observer sees an image lying in the direction of this straight line. FIG. 7C shows aberrations in the horizontal and vertical directions occurring when the observer sees an image which is at 15.0° right (−Y direction) of the straight line.

Embodiment 2

This embodiment is basically the same as the embodiment 1. However, embodiment 2 differs from the embodiment 1 in that the reflecting mirror 6 is a rotationally symmetric aspherical reflecting mirror. Constituent parameters of the optical systems will be shown below by using the same symbols as those used in the embodiment 1. When the coordinate system is set as illustrated in FIG. 2 and the paraxial curvature radius is represented by R, the aspherical configuration may be expressed by $$Z = (h^2/R)/[1 + \{1 - (1 + K)(h^2/R^2)\}^{1/2}] + Ah^4 + Bh^6 + Ch^8$$

$$(h^2 = X^2 + Y^2)$$

where K is a conical coefficient, and A, B, C are 4th-, -6th and 8th-order aspherical coefficients, respectively.

| Surface No. | Curvature radius | Surface separation | Eccentricity |
|---|---|---|---|
| 1 | exit pupil (1) | 50.0 | $Y_1$ −28.285 |
| 2 | 52.0154 (6) (aspheric surface) | 22.398 | $Y_2$ −6.025 |
| 3 | 29.8172 (image surface 7) | | |

Aspherical coefficients
Second surface (reflecting mirror 6)

$K = 0$
$A = -0.124395 \times 10^{-5}$
$B = 0$
$C = 0$
$\alpha = 12.318°$ with respect to the center of the exit pupil 1 is $Y_1$; the eccentricity of the axis 6a with respect to the center of the first surface of the relay optical system 8 is $Y_2$; the eccentricity in the Y-axis direction of the optical axis 8a of the relay optical system 8 with respect to the center of the two-dimensional image display device 7 is $Y_3$; an angle of inclination of the axis 6a of the concave mirror 6 with respect to the optical axis 8a of the relay optical system 8 is $\alpha_1$; and an angle of inclination of a plane perpendicular 8b to the optical axis 8a of the relay optical system 8 with respect to the display surface of the two-dimensional image display device 7 is $\alpha_2$. Accordingly, in the arrangement shown in FIG. 3, $Y_1$ is negative; $Y_2$ is positive; $Y_3$ is negative; $\alpha_1$ is positive; and $\alpha_2$ is positive.

Constituent parameters of the optical system will be shown below. It should be noted that the surface Nos. are put as ordinal numbers in backward tracing from the exit pupil 1 toward the two-dimensional image display device 7. Regarding the surface separation, the spacing between the exit pupil 1 and the concave mirror 6 is shown as a distance in the Z-axis direction between the center of the exit pupil 1 and the center of the concave mirror 6. The spacing between the first surface of the relay optical system 8 and the image surface thereof (the two-dimensional image display device 7) is shown as a distance along the optical axis 8a. As to the relay optical system 8, the first to seventh lens surfaces are denoted by $r_1$ to $r_7$, and the surface separations by $d_1$ to $d_7$.

| Surface No. | Curvature radius | Separation | Eccentricity | Inclination angle | Refractive index |
|---|---|---|---|---|---|
| 1 (1) | exit pupil | 50.0 | $Y_1$ −28.285 | | |
| 2 (6) | $R_y$ 65.909 $R_x$ 39.151 (aspheric surface) | | $Y_2$ 28.2546 | $\alpha_1$ 53.1889° | |
| 3 ($r_1$) | −17.439 | 4.0 ($d_1$) | | | 1.72916 |
| 4 ($r_2$) | −16.374 | 1.0 ($d_2$) | | | |
| 5 ($r_3$) | 40.383 | 4.0 ($d_3$) | | | 1.72916 |
| 6 ($r_4$) | −43.930 | 1.0 ($d_4$) | | | |
| 7 ($r_5$) | 10.688 | 6.0 ($d_5$) | | | 1.51633 |
| 8 ($r_6$) | −16.881 | 2.0 ($d_6$) | | | 1.80518 |
| 9 ($r_7$) | −188.062 | 10.0 ($d_7$) | | | |
| 10 (7) | image surface | | $Y_3$ −0.19518 | $\alpha_2$ 12.94946° | |

Aspherical coefficients
Second surface (concave mirror 6)

Figure 5:
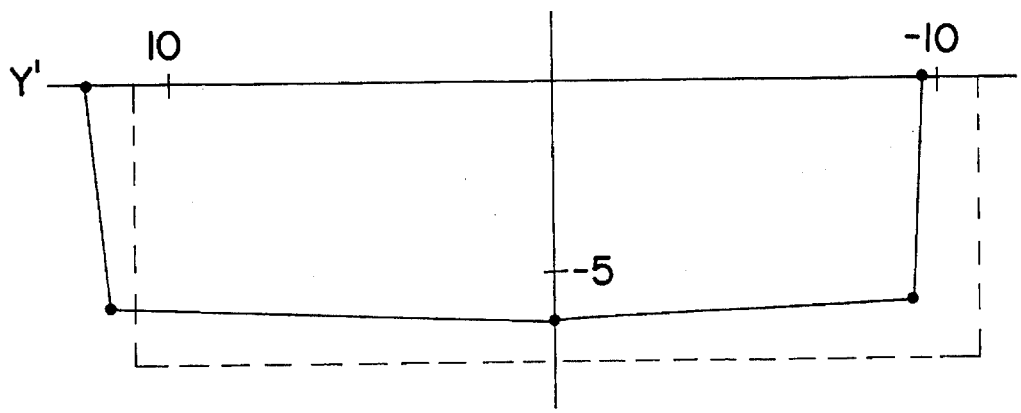
FIG. 5 shows image distortion in embodiment 2 of the present invention.
Figure 8A:
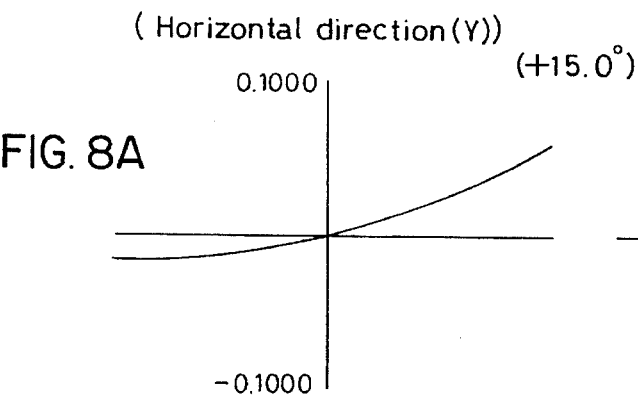
FIGS. 8A to 8C graphically show lateral aberration in embodiment 2 of the present invention.
Figures 1, 8A:
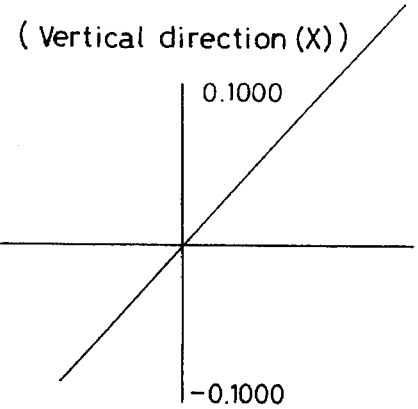
Figure 8B:
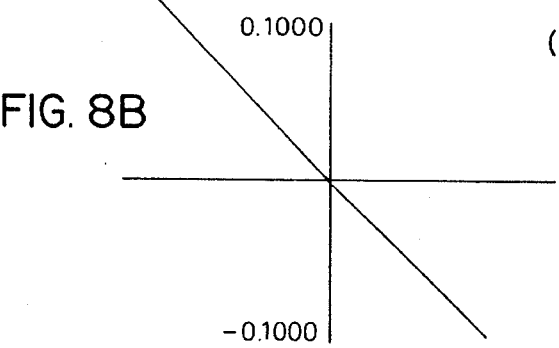
Figures 1, 8B:
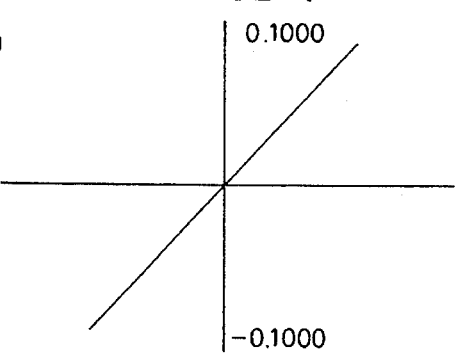
Figure 8C:
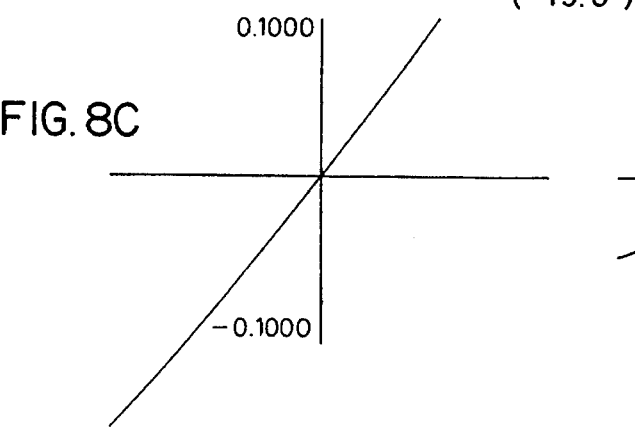
Figures 1, 8C:
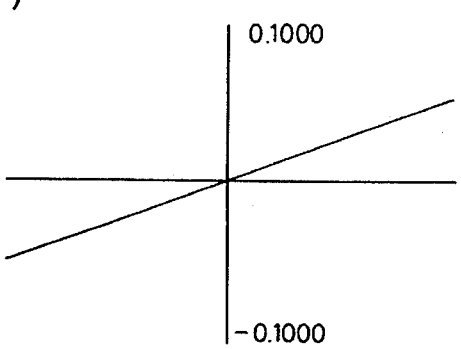

$K_y = 0$
$AR = -0.109807 \times 10^{-5}$
$BR = 0.281845 \times 10^{-13}$
$CR = 0$ $K_x = 0$
$AP = -0.640989$
$BP = 0.203281 \times 10^2$
$CP = 0$ FIG. 5 shows image distortion in this embodiment in the same way as shown in FIG. 4. FIGS. 8A to 8C graphically show lateral aberration in this embodiment in the same way as in FIG. 7A to 7C.

Embodiment 3

Figure 3:
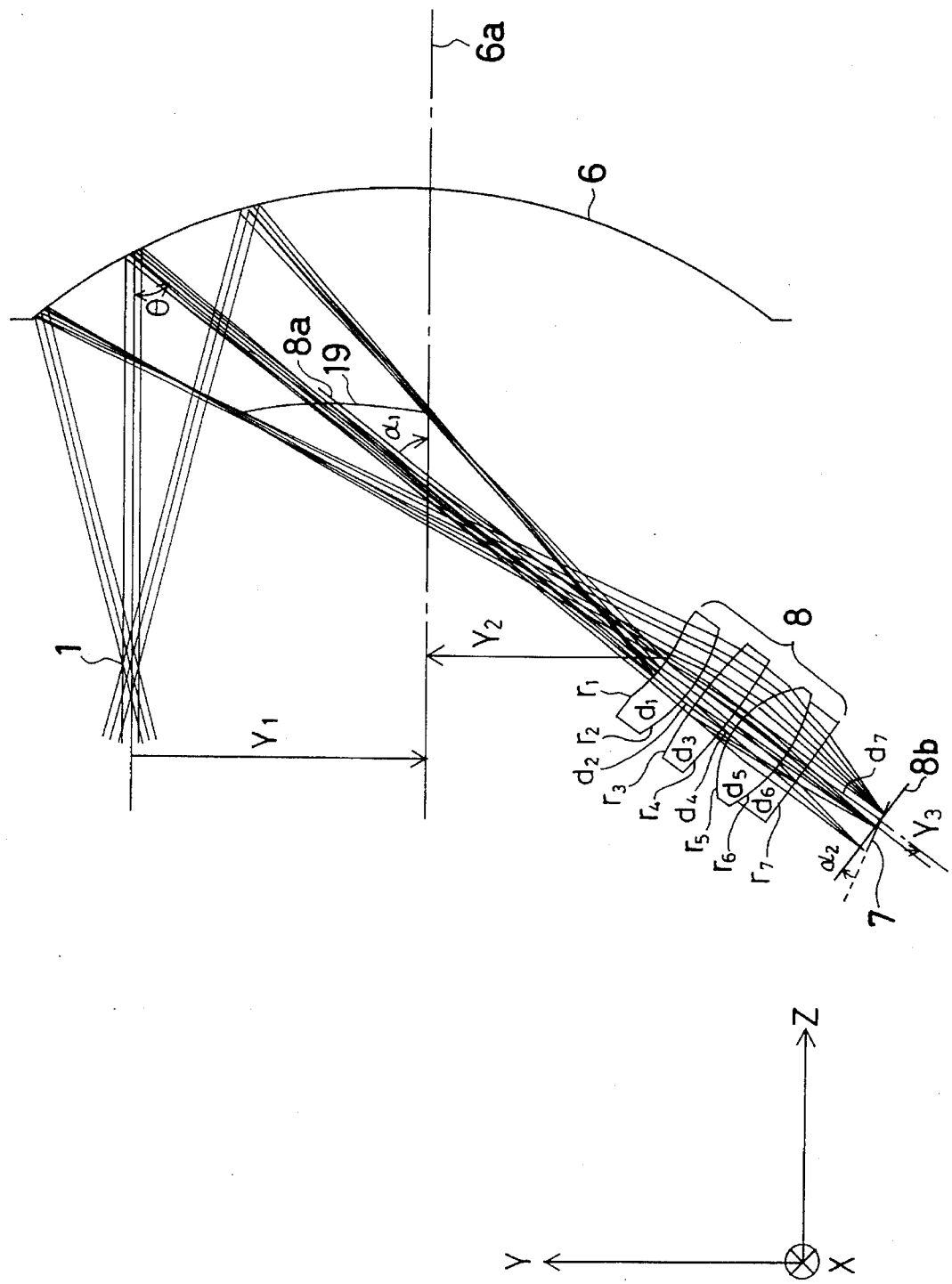
FIG. 3 shows the optical arrangement of embodiment 3 of the present invention.

In this embodiment, as shown in FIG. 3, an image of a two-dimensional image display device 7 is formed on an object surface (focal surface) 19 of a concave mirror 6 as an aerial image by using a relay optical system 8. The concave mirror 6 is an anamorphic aspherical reflecting mirror. It is assumed that the optical axis of the relay optical system 8 is 8a; the eccentricity of the axis 6a of the reflecting mirror 6

Figure 6:
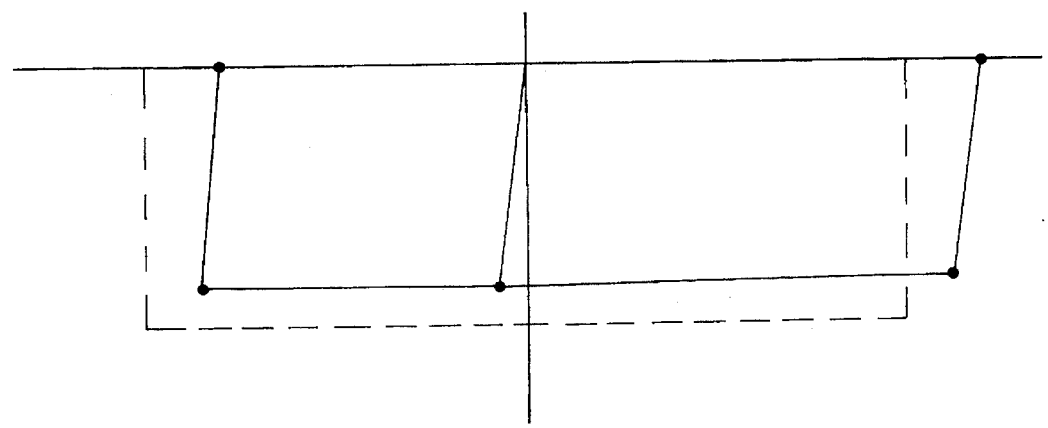
FIG. 6 shows image distortion in embodiment 3 of the present invention.

FIG. 6 shows image distortion in this embodiment in the same way as shown in FIG. 4. FIGS. 9A to 9C graphically show lateral aberration in this embodiment in the same way as shown in FIGS. 7A to 7C.

In this embodiment, an image of the two-dimensional image display device 7 can be projected as a magnified image by the relay optical system 8. Therefore, it is possible to use a small-size display device as the two-dimensional image display device 7 and hence it is possible to reduce the overall side of the apparatus.

Embodiment 4

Figure 10:
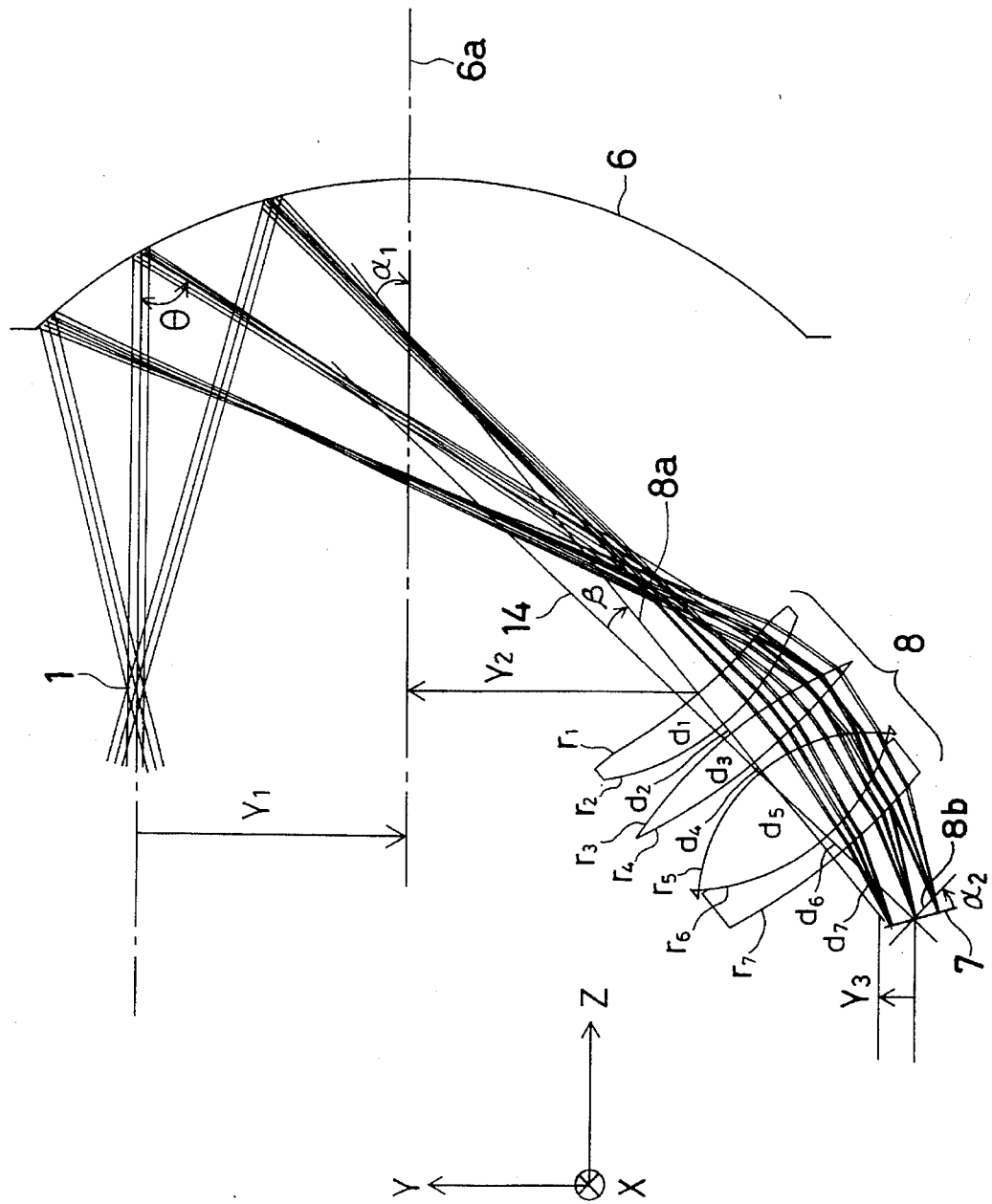
FIG. 10 shows the optical arrangement of embodiment 4 of the present invention.

FIG. 10 shows the optical arrangement of this embodiment. In the figure, reference numeral 7 denotes an LCD (Liquid Crystal Display) type two-dimensional image display device, and reference numeral 8 denotes an eccentric relay optical system. Reference numeral 6 denotes a concave reflecting mirror, and reference numeral 1 denotes an observer's eyeball iris position or eyeball rolling center. Reference numeral 8a denotes the optical axis of the relay optical system 8. Reference numeral 14 denotes a straight line connecting the center of the two-dimensional image display device 7 and the center of an image formed by the relay optical system 8. Reference numeral 6a denotes the axis of the concave spherical mirror 6. Coordinates are assigned as shown in FIG. 10. It is assumed that the eccentricity of the axis 6a of the concave spherical mirror 6 with respect to the center of the exit pupil 1 is $Y_1$; the eccentricity of the axis 6a with respect to the center of the first surface of the relay optical system 8 is $Y_2$; the eccentricity in the Y-axis direction of the optical axis 8a of the relay optical system 8 with respect to the center of the two-dimensional image display device 7 is $Y_3$; the angle of inclination of the axis 6a of the concave spherical mirror 6 with respect to the optical axis 8a of the relay optical system 8 is $\alpha_1$; the angle of inclination of a plane perpendicular 8b to the optical axis 8a of the relay optical system 8 with respect to the display surface of the two-dimensional image display device 7 is $\alpha_2$; and an angle of inclination of the optical axis 8a of the relay optical system 8 with respect to the straight line 14 is $\beta$. Accordingly, in the arrangement shown in FIG. 10, $Y_1$ is negative; $Y_2$ is positive; $Y_3$ is positive; $\alpha_1$ is positive; $\alpha_2$ is negative; $\beta$ is positive.

Constituent parameters of the optical system will be shown below. It should be noted that the surface Nos. are put as ordinal numbers in backward tracing from the observer's pupil 1 toward the two-dimensional image display device 7. Regarding the surface separation, the spacing between the exit pupil 1 and the concave spherical mirror 6 is shown as a distance in the Z-axis direction between the center of the exit pupil 1 and the center of the concave spherical mirror 6. The spacing between the concave spherical mirror 6 and the first surface of the relay optical system 8 is shown as a distance in the Z-axis direction between the center of the concave spherical mirror 6 and first surface of the relay optical system 8. The spacing between the first surface of the relay optical system 8 and the image surface thereof (the two-dimensional image display device 7) is shown as a distance along the optical axis 8a. As to the relay optical system 8, the first to seventh lens surfaces are denoted by $r_1$ to $r_7$, and the surface separations by $d_1$ to $d_7$.

length is longer than 28 mm, the amount to which the viewing optical system projects from the observer's face becomes large, and the overall size of the apparatus increases, which gives rise to the problem that the observer feels uncomfortable when wearing the visual display.

Figure 11:
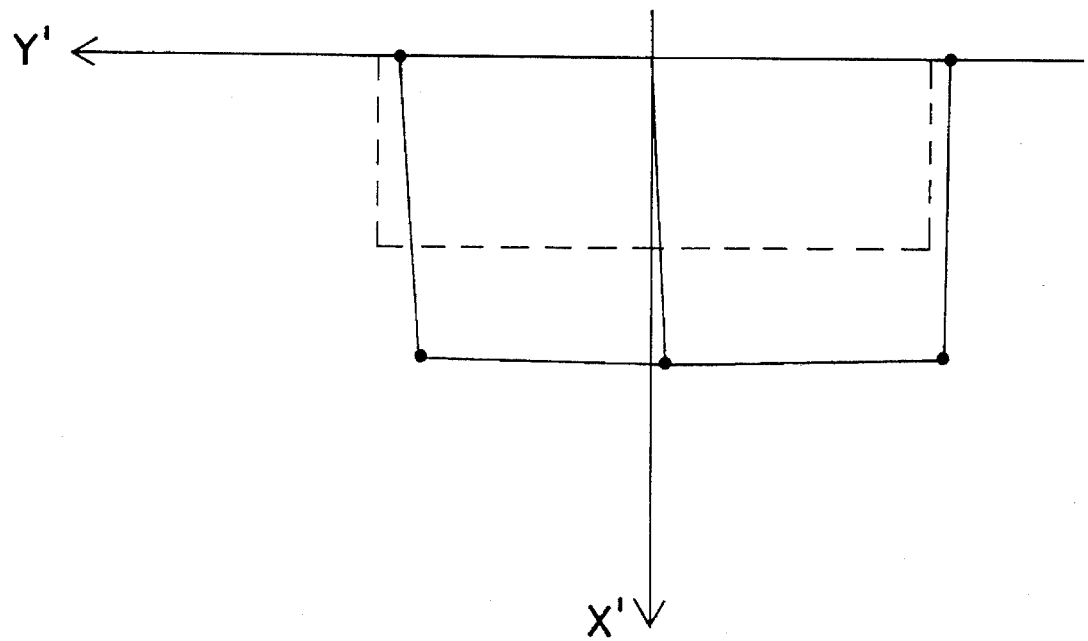
FIG. 11 shows image distortion in embodiment 4 of the present invention.

FIG. 11 shows image distortion in this embodiment. In FIG. 11, the dotted line shows the ideal image position, and the solid line shows the actual imagery position of the optical system.

Embodiment 5

This embodiment is basically the same as the embodiment 4. However, embodiment 5 differs from the embodiment 4 only in that the concave mirror 6, which is shown in FIG. 10, is an anamorphic aspherical reflecting mirror. In this case, the paraxial curvature radius $R_x$ of the concave reflecting mirror 6 in the vertical direction (X-Z plane) and the paraxial curvature radius $R_y$ in the horizontal direction (Y-Z plane) are different from each other. When the coordinate system is set as illustrated in the figure, the aspherical configuration may be expressed by.

$$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] + AR[(1 - AP)X^2 + (1 + AP)Y^2]^2 +$$
$$BR[(1 - BP)X^2 + (1 + BP)Y^2]^3 + CR[(1 - CP)X^2 + (1 + CP)Y^2]^4$$

where $K_x$ is the conical coefficient in the X-direction; $K_y$ is the conical coefficient in the Y-direction; AR, BR and CR are rotationally symmetric 4th-, 6th- and 8th-order aspherical coefficients, respectively; and AP, BP and CP are asymmetric 4th-, 6th- and 8th-order aspherical coefficients, respectively.

Parameters of the optical system will be shown below by using the same symbols as those used in the embodiment 4.

| Surface No. | Curvature radius | Separation | Eccentricity | Inclination angle | Refractive index |
|---|---|---|---|---|---|
| 1 (1) | exit pupil | 50.0 | $Y_1$ −28.285 | | |
| 2 (6) | 57.270 | −49.9 | $Y_2$ 28.285 | $\alpha_1$ 40.655° | |
| 3 ($r_1$) | −79.790 | 4.0 ($d_1$) | | | 1.729157 |
| 4 ($r_2$) | −25.690 | 1.0 ($d_2$) | | | |
| 5 ($r_3$) | 45.614 | 4.0 ($d_3$) | | | 1.729157 |
| 6 ($r_4$) | −55.972 | 1.0 ($d_4$) | | | |
| 7 ($r_5$) | 17.465 | 9.0 ($d_5$) | | | 1.516330 |
| 8 ($r_6$) | −20.423 | 2.0 ($d_6$) | | | 1.805181 |
| 9 ($r_7$) | −59.782 | 10.0 ($d_7$) | | | |
| 10 (7) | image surface | | $Y_3$ 2.5673 | $\alpha_2$ −21.301° | |

The focal length of the relay optical system 8: 13.84 mm
The inclination angle β of the relay optical system 8: 7°

The focal length of the ocular optical system 6 is 28 mm. If the focal length is shorter than 28 mm, the ocular optical system 6 may interfere with the observer's face. If the focal

| Surface No. | Curvature radius | Separation | Eccentricity | Inclination angle | Refractive index |
|---|---|---|---|---|---|
| 1 (1) | exit pupil | 50.0 | $Y_1$ −28.285 | | |
| 2 (6) | $R_y$ 57.270 $R_x$ 55.642 (aspheric surface) | −49.9 | $Y_2$ 28.2845 | $\alpha_1$ 40.6887° | |
| 3 ($r_1$) | −56.488 | 4.0 ($d_1$) | | | 1.729157 |
| 4 ($r_2$) | −23.931 | 1.0 ($d_2$) | | | |
| 5 ($r_3$) | 36.299 | 4.0 ($d_3$) | | | 1.729157 |
| 6 ($r_4$) | −53.630 | 1.0 ($d_4$) | | | |
| 7 ($r_5$) | 18.588 | 9.0 ($d_5$) | | | 1.516330 |
| 8 ($r_6$) | −18.455 | 2.0 ($d_6$) | | | 1.805181 |
| 9 ($r_7$) | −69.311 | 10.0 ($d_7$) | | | |
| 10 (7) | image surface | | $Y_3$ 2.4852 | $\alpha_2$ −20.816° | |

| Aspherical coefficients |
|---|
| AR = −0.176890 × 10$^{-7}$ |
| AP = −0.873450 |
| The other coefficients = 0 |

The focal length of the relay optical system 8: 13.72 mm
The inclination angle β of the relay optical system 8: 8°

Figure 12:
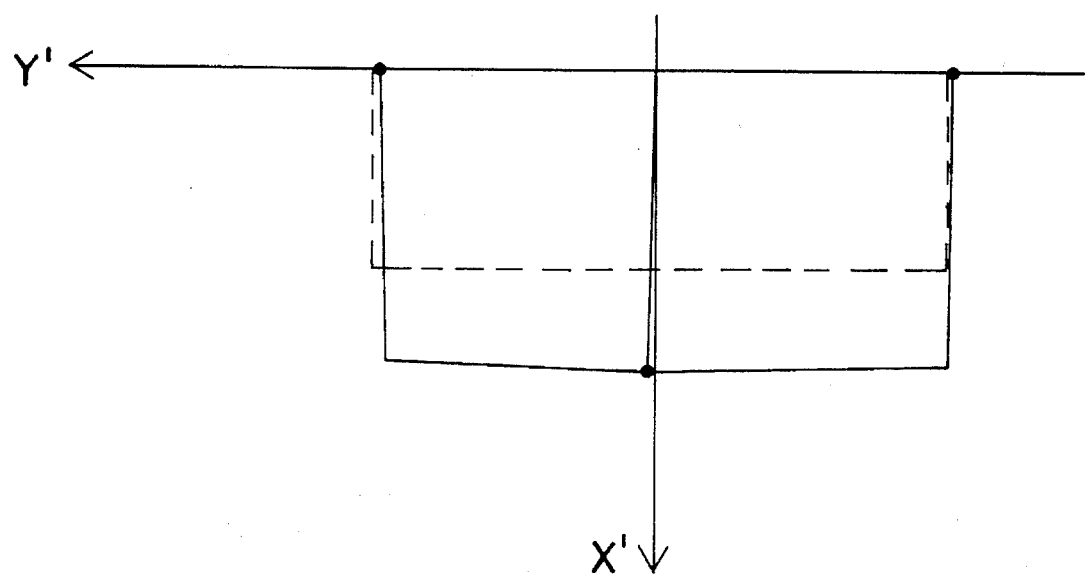
FIG. 12 shows image distortion in embodiment 5 of the present invention.
Figure 13A:
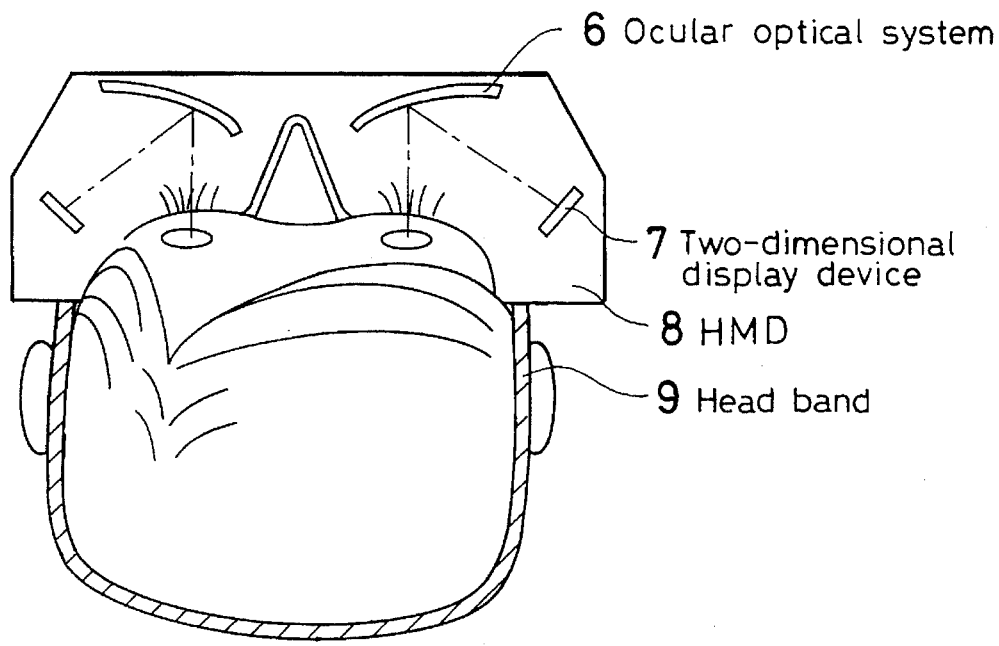
FIGS. 13A and 13B are views for explanation of a support means used when the visual display of the present invention is mounted on the observer's head.
Figure 13B:
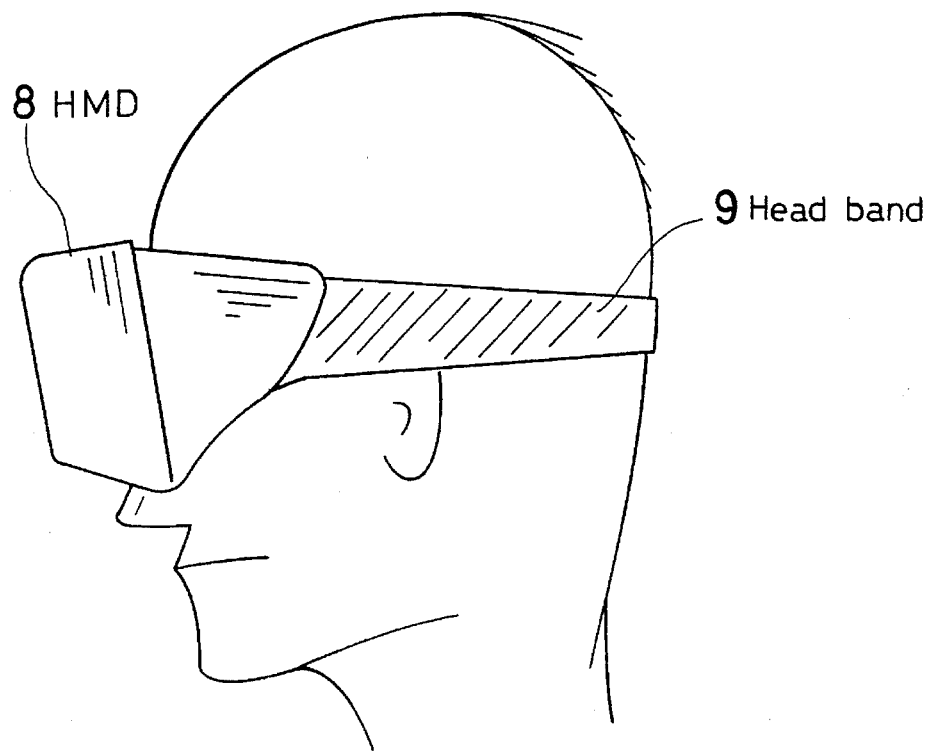
Figure 14A:
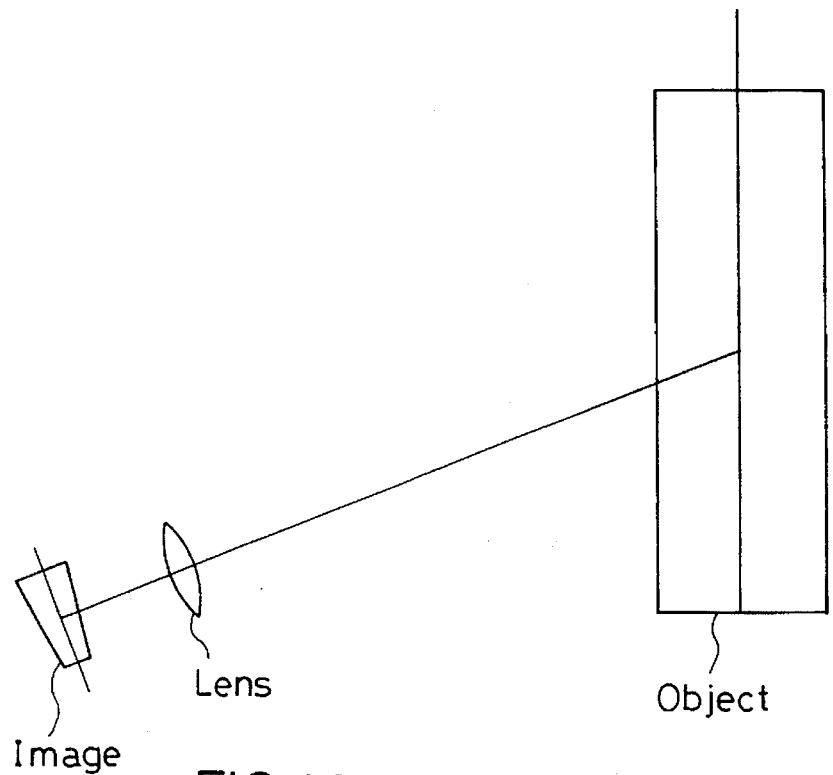
FIGS. 14A and 14B are views for explanation of swing & tilt photography.
Figure 14B:
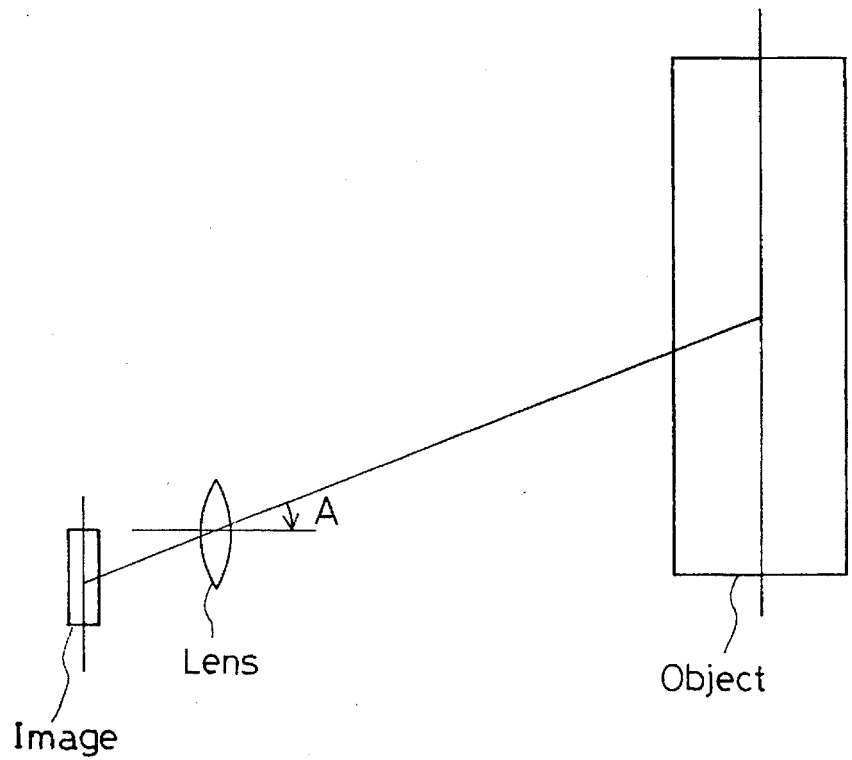
Figure 15:
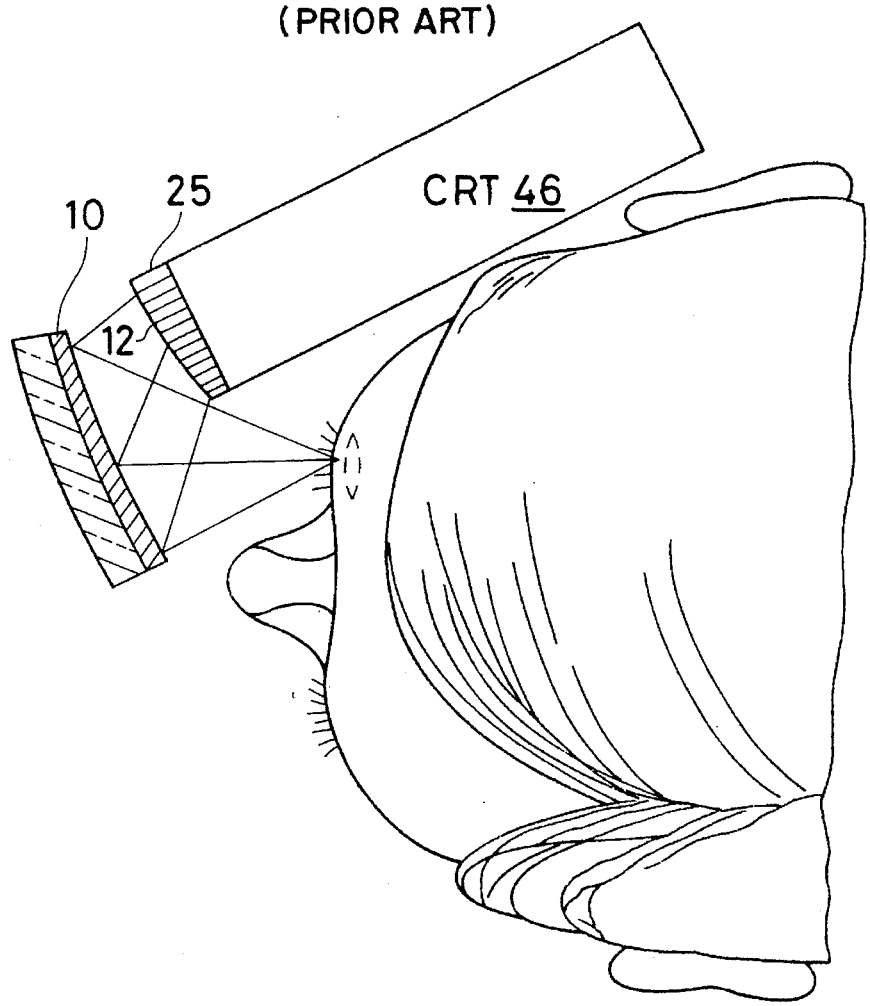
FIG. 15 is a plan view of a conventional face-mounted display.
Figure 16:
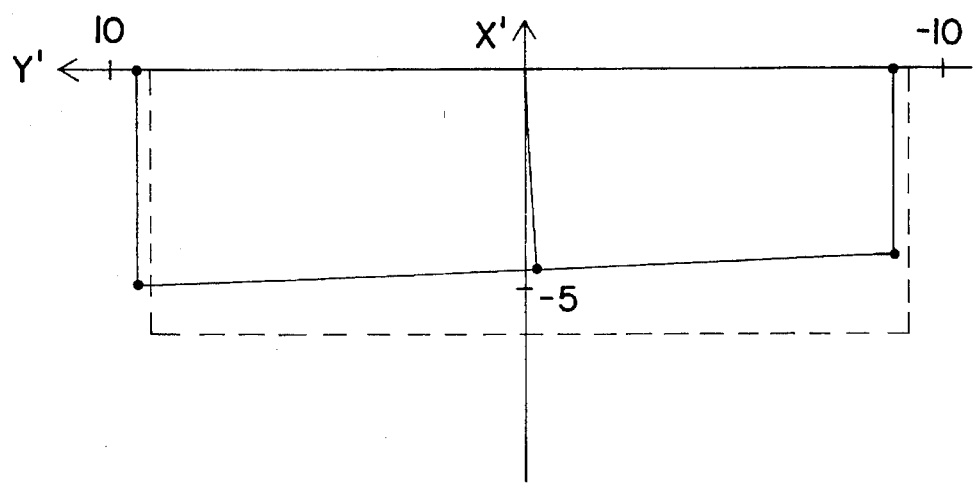
FIG. 16 shows image distortion caused by a conventional reflecting mirror with a toric surface.
Figure 17:
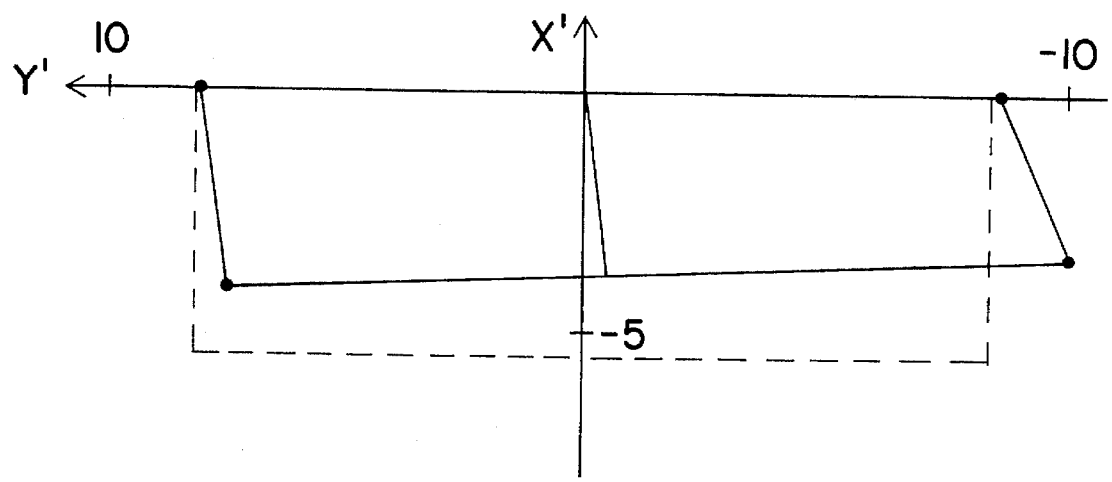
FIG. 17 shows image distortion caused by a conventional reflecting mirror with an elliptical surface.
Figure 18A:
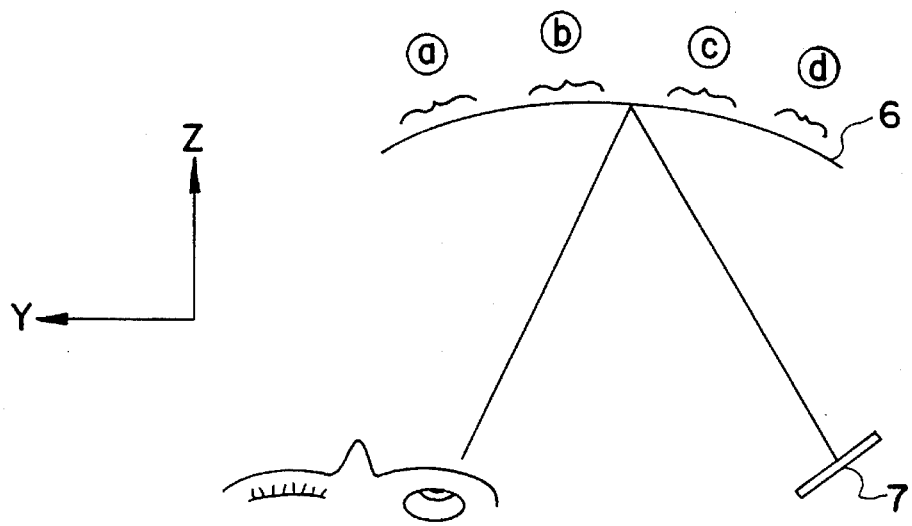
FIG. 18A shows a view in a plane defined by the optical axis before and after deviation.
Figure 18B:
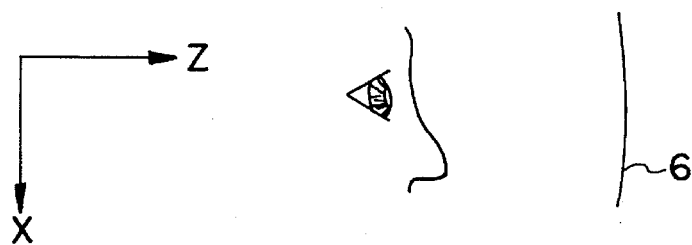
FIGS. 18B–18E show the variation in curvature of the concave mirror surface in a plane perpendicular to the plane defined by the optical axis before and after deviation.
Figure 18C:
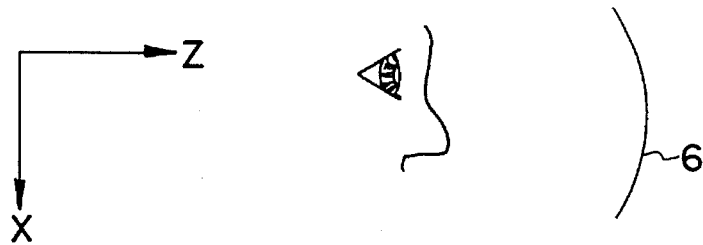
Figure 18D:
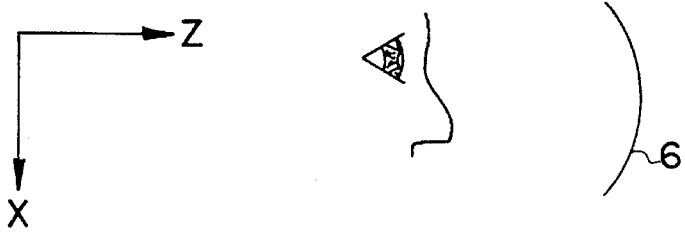
Figure 18E:
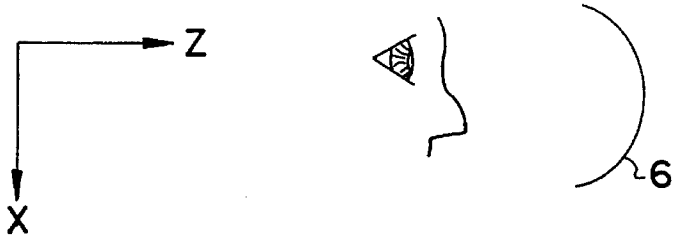

FIG. 12 shows distortion in this embodiment.

It should be noted that in each of the above-described embodiments the concave reflecting mirror 6 is not necessarily limited to be a totally reflecting mirror, but it may be a semitransparent mirror. If a semitransparent mirror is used, the displayed image can be superimposed upon the outside, real world image, as is well known.

Although the visual display of the present invention has been described by way of some embodiments, it should be noted that the present invention is not necessarily limited to these embodiments and that various changes and modifications may be imparted thereto.

As will be clear from the foregoing description, it is possible according to the present invention to provide a head or face-mounted display which enables the observer to view a clear image with minimal distortion at a wide field angle.

What we claim is:

1. A visual display comprising:

a two-dimensional display device for displaying a two-dimensional image for observation;

an ocular optical system having a concave reflecting mirror, said concave reflecting mirror at least partially reflecting said image for observation to form a magnified image as observed by an observer's eyeball; and distortion correcting means for correcting distortion of said magnified image by altering a concavity of said concave reflecting mirror aspherically such that a vertical radius of curvature of said concave reflecting mirror gradually decreases across a horizontal linear direction from a first side of said concave reflecting mirror corresponding to said observer's eyeball toward a second side of said concave reflecting mirror corresponding to said two-dimensional display device, said vertical radius of curvature being parallel to a linear direction approximately perpendicular to a plane defined by a reflected optical axis between a center of said display device and a center of said observer's eyeball before and after said at least partial reflection by said concave reflecting mirror, said distortion correcting means being formed by a rotationally asymmetric surface of said concave reflecting mirror.

2. A visual display according to claim 1, wherein:

said concave reflecting mirror is disposed such that an angle between said reflected optical axis between center of said display device and said center of said observer's eyeball before said at least partial reflection and said reflected optical axis after said at least partial reflection by said concave reflecting mirror is not smaller than 20 degrees.

3. A visual display according to claim 1, wherein:

said concave reflecting mirror of said ocular optical system is a totally reflecting mirror.

4. A visual display according to claim 1, wherein:

said concave reflecting mirror of said ocular optical system is a concave anamorphic aspherical reflecting mirror.

5. A visual display comprising:

a right and a left two-dimensional display device, each of said right and left two-dimensional display devices displaying a respective right and left image for observation by an observer's right and left eyes, respectively;

an ocular optical system at least partially reflecting said right and left images for observation as respective right and left magnified images as observed by said observer's right and left eyes, respectively; and right and left distortion correcting means respectively provided in said ocular optical system, for correcting distortion of said respective right and left magnified images directed toward said observer's right and left eyes, respectively, said right and left distortion correcting means comprising a reflecting surface with an aspherical configuration in which a radius of curvature of said reflecting surface gradually increases toward said respective right and left two-dimensional display devices from said observer's respective right and left eyes in a direction approximately perpendicular to a plane defined by a reflected optical axis between a center of said respective right and left two-dimensional display devices and a center of said observer's respective right and left eyes before and after said at at least partial reflection by said reflecting surface;

said right and left two-dimensional display devices being oriented such that an imaginary extension of said optical axis exiting from said right two-dimensional display device passes through said ocular optical system and intersects an imaginary extension of said optical axis exiting from said left two-dimensional display device and passing through said ocular optical system.

6. A visual display according to claim 5, wherein:

said ocular optical system comprises a first independent ocular optical system for said observer's right eye and a second independent ocular optical system for said observer's left eye.

7. A visual display according to claim 5, wherein:

said right and left distortion correcting means comprises:
   right distortion correcting means provided in front of said observer's right eye, and
   left distortion correcting means provided in front of said observer's left eye, said left distortion correcting means being separate from said right distortion correcting means;

said right distortion correcting means and said left distortion correcting means each having a respective radius of curvature which is approximately symmetric with respect to a boundary between said right distortion correcting means and said left distortion correcting means.

8. A visual display according to claim 1, 5 or 7, wherein:

said ocular optical system has a focal length in a range of from 30 millimeters to 60 millimeters.

9. A visual display according to claim 7, wherein:

said respective radius of curvature of each of said right distortion correcting means and said left distortion correcting means vary toward the right and left of said observer, respectively, in reverse relation to each other.

10. A visual display according to claim 7 or 9, wherein:

said right distortion correcting means and said left distortion correcting means are each formed from a rotationally asymmetric surface.

11. A visual display according to claim 5 or 7, wherein:

said reflecting surface is disposed such that a first angle between a right reflected optical axis between said center of said right two-dimensional display device and said center of said observer's right eye, and a second angle between a left reflected optical axis between said center of said left two-dimensional display device and said center of said observer's left eye before said at least partial reflection and respective right and left reflected optical axes after said at least partial reflection by said reflecting surface are not smaller than 20 degrees.

12. A visual display comprising:

a two-dimensional display device for displaying a two-dimensional image for observation;

an ocular optical system; and a concave reflecting mirror, said concave reflecting mirror at least partially reflecting said image for observation to form a magnified image as observed by an observer's eyeball, said concave reflecting mirror being rotationally asymmetric such that a radius of curvature of said concave reflecting mirror in a first direction gradually decreases across a linear direction from said observer's eyeball.

13. A visual display comprising:

a two-dimensional display device to be disposed beside an observer's face; and an ocular optical system for leading an image formed by said two-dimensional display device to an observer's eyeball, said ocular optical system including:
   an aspherical surface disposed to face said two-dimensional display device, said aspherical surface satisfying a condition:

$$R_x < R_y$$

wherein said $R_x$ is a first paraxial curvature radius of said aspherical surface in an X-Z plane direction perpendicular to an optical axis which is turned back in a Y-Z plane direction, and said $R_y$ is a second paraxial curvature radius of said aspherical surface in said Y-Z plane direction.

14. A visual display comprising:

a two-dimensional display device to be disposed beside of an observer's face; and an ocular optical system for leading an image formed by said two-dimensional display device to an observer's eyeball, said ocular optical system including:
   an aspherical surface having a concave surface directed toward said observer's eyeball, said concave surface of said aspherical surface satisfying a condition:

$$R_x < R_y$$

wherein said $R_x$ is a first paraxial curvature radius of said concave surface of said aspherical surface in an X-Z plane direction perpendicular to an optical axis which is turned back in a Y-Z plane direction, and said $R_y$ is a second paraxial curvature radius of said concave surface of said aspherical surface in said Y-Z plane direction.

15. A visual display according to claim 13 or 14, wherein:

said aspherical surface has at least a reflecting action.

16. A visual display according to claim 13 or 14, wherein:

said aspherical surface has both a reflecting action and a transmitting action.

* * * * *